Jan. 13, 1959     R. A. FRYE     2,868,568
KNOCK DOWN STRUCTURES
Filed April 29, 1958     3 Sheets-Sheet 1
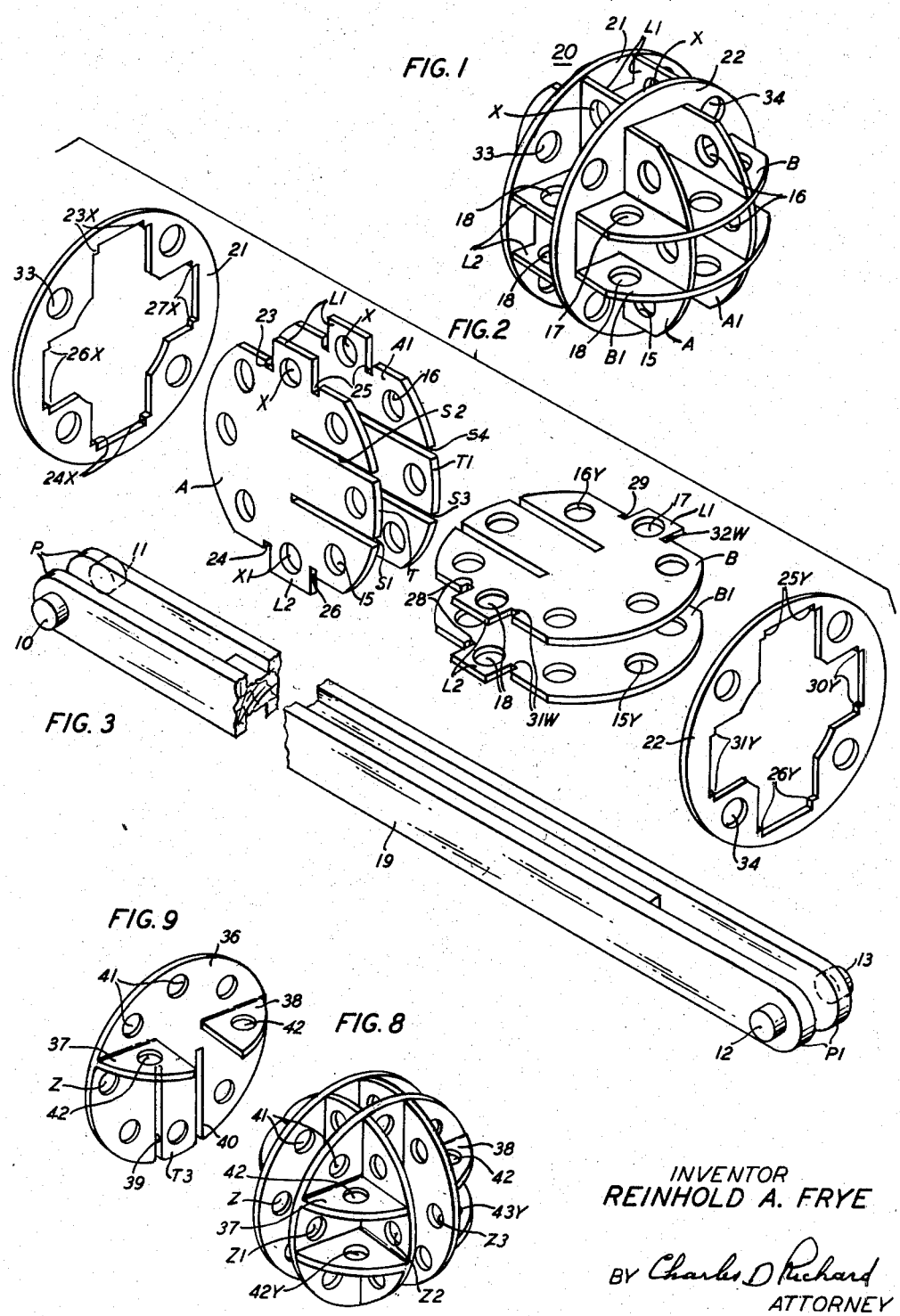
INVENTOR
REINHOLD A. FRYE
BY Charles D Richard
ATTORNEY Jan. 13, 1959

R. A. FRYE 2,868,568

KNOCK DOWN STRUCTURES

Filed April 29, 1958

INVENTOR
REINHOLD A. FRYE

BY Charles D. Richard
ATTORNEY

Jan. 13, 1959
R. A. FRYE
2,868,568
KNOCK DOWN STRUCTURES
Filed April 29, 1958
3 Sheets-Sheet 3
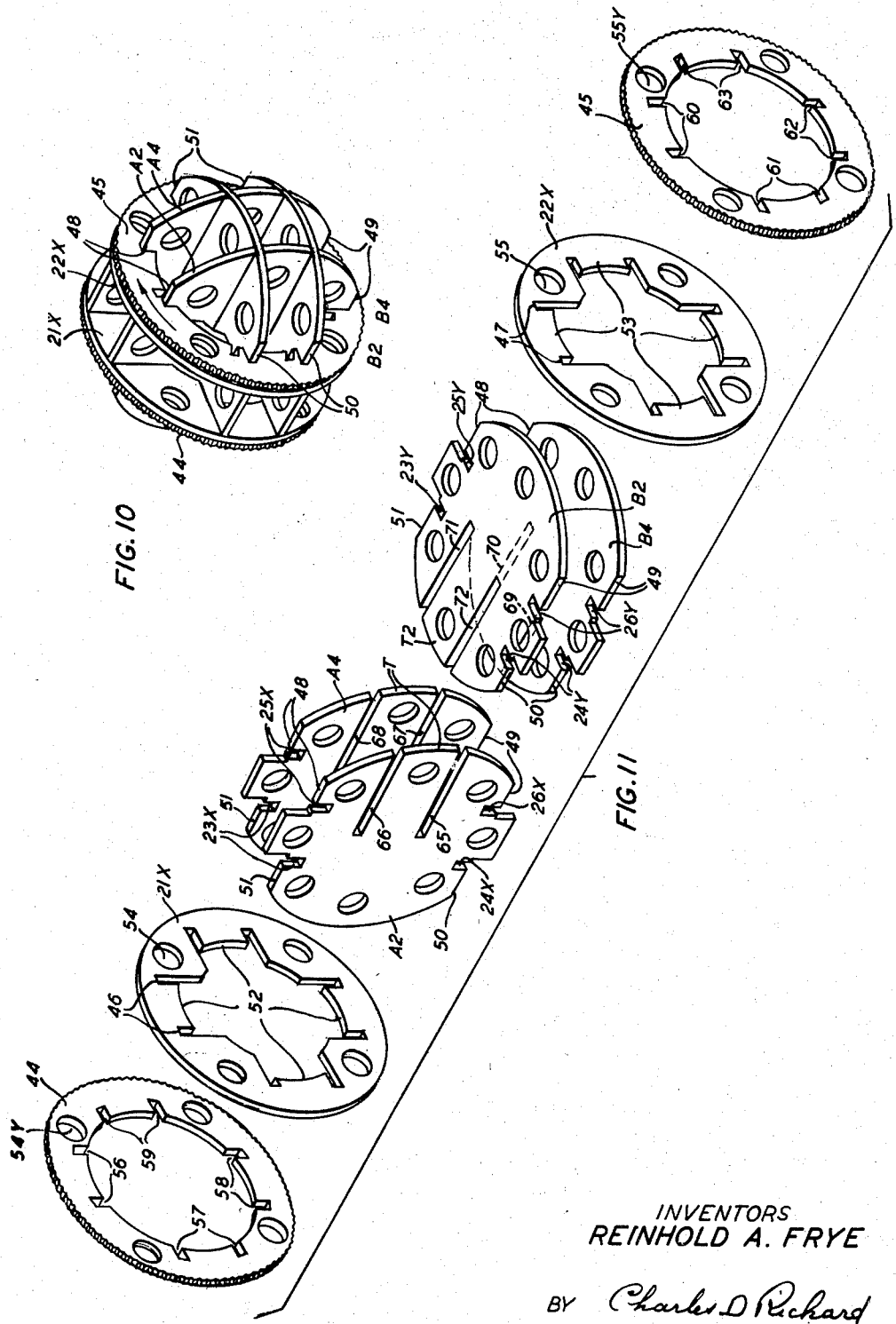
INVENTORS
REINHOLD A. FRYE
BY Charles D Richard
ATTORNEY

United States Patent Office

2,868,568
Patented Jan. 13, 1959

2,868,568

KNOCK DOWN STRUCTURES

Reinhold A. Frye, Little Falls, N. J.

Application April 29, 1958, Serial No. 731,800

10 Claims. (Cl. 287—54)

This invention has reference to so-called knockdown structures, and more specifically to a type of connector device which is well adapted for use for interconnecting spacer bars in planes at right angles to each other, as in the erection, for example, of structures appertaining to the art of toys and the like structures.

The connector device of the present invention is related to the connector device used in the knockdown structure forming the subject matter of Patent 2,780,484, dated February 5, 1957, issued to me, disclosing a connector device in which a plurality of ring shaped members are formed with screw elements in the form of resilient projections extending radially from the inner peripheries of the rings toward the center thereof and arranged by pairs, adapted to be engaged by the differentially screw threaded end portions of spacer bars used in the erection of towers, scaffolding and similar structures. While such connector device has been found entirely satisfactory in use for the erection of large and heavy structures, the present invention has for object the provision of a connector device comprising disc-like members adapted to be constructed of relatively thin sheet material either metallic, plastic or fibrous, embodying means for interfitting and interlocking each other in pairs in parallel spaced relation and arranged in planes at right angles to each other, with rows of bearing apertures in the discs in each pair cooperating for receiving pivots carried by the spacer bars used for erecting structures which may represent any geometrical figure desired.

The novel features of the invention will appear from the following description and by the claims appended thereto, reference being had to the accompanying drawing in which:

Fig. 1 is an assembly view of the connector device of the invention shown in perspective;

Fig. 2 is an exploded view, in perspective, of the connector device showing the cooperating parts in their successive engageable order;

Fig. 3 is a view of a spacer bar shown in perspective used for interconnecting any two connectors in the erection of a structure;

Fig. 8 is an assembly view, shown in perspective, of the connector device shown in Fig. 1, modified;

Fig. 9 is a view of one of four similar disc members used in the connector device assembly shown in Fig. 8, the disc member being shown in perspective;

Fig. 10 is an assembly view, shown in perspective, of another modification of the connector device shown in Fig. 1; and Fig. 11 is an exploded view of the connector shown in Fig. 10 with the cooperative discs and ring shaped members of the connector disposed in successive engageable order, the discs and ring members being shown in perspective.

Figure 4:
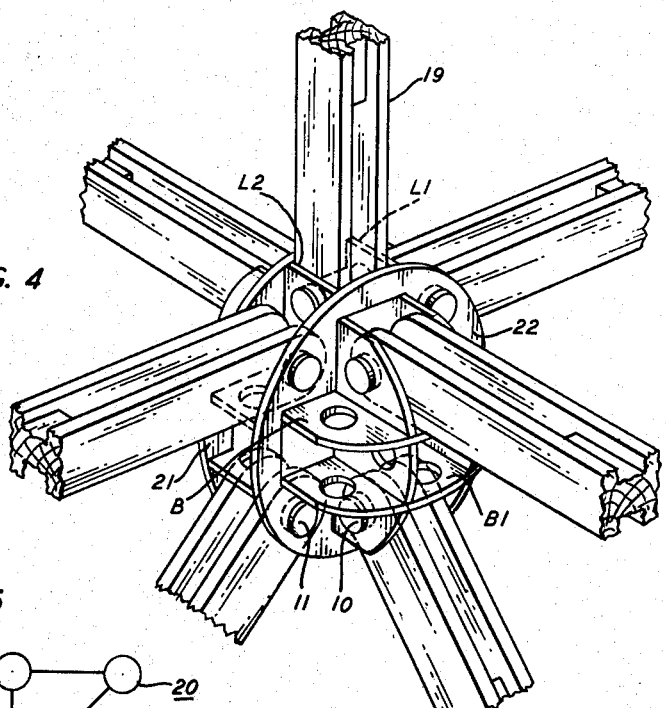
Fig. 4 is an assembly view of the connector device with spacer bars connected thereto, the assembly being shown in perspective, and the bars shown with portions broken away.
Figure 5:
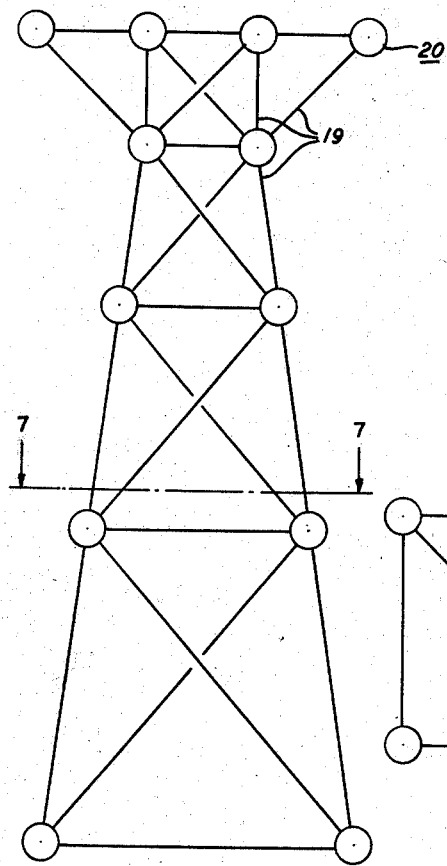
Fig. 5 is an elevation view of a tower structure erected by the use of the connector device shown in Fig. 1, and the use of the spacer bar shown in Figs. 3 and 4.

The erection of a toy structure, as shown in Fig. 5 for example, may conveniently and quickly be effected by the use of any number of connector devices shown at 20, Fig. 1, connecting with cooperating spacer bars as 19, Fig. 3, which may be of any desired number and length. The connector device of the present invention, as shown in Figs. 1, 2, and 4, consists of two pairs of similarly shaped disc members A—A1 and B—B1, formed at their peripheries with parallelly disposed straight edges and diametrically opposite radially projecting lug members L1 and L2, defining the space and parallel relation between ring members 21—22 when the disc members A—A1 and B—B1 are positioned in assembled relation, as shown in Figs. 1 and 4.

Each disc member A—A1 and B—B1 is provided with a circular row of equally spaced bearing apertures as 15—16 in the disc members A—A1 and 15Y—16Y in the disc members B—B1 serving for receiving coaxially disposed studs or pivots, as 10—11 and 12—13, carried by flexible prongs P and P1 formed at the ends of the forked spacer bar 19 shown in Fig. 3, each bar serving for connecting any two connector devices in a manner which will be hereinafter described in detail.

The disc members A—A1 and B—B1 are each provided with a pair of parallelly disposed slots as S1—S2 and S3—S4, each of a width corresponding to or slightly larger than the thickness of the material used in the construction of these disc members for interfitting for example the disc members B—B1 into the slots S1—S2 and S3—S4 in disc members A—A1, these slots extending from the peripheral curved edges of the disc members to a line passing through the centers of two diametrically opposite bearing apertures as X—X1 in the pairs of lugs L1 and L2 of the disc members A—A1, while the width of the tongue portions T and T1 formed by these slots define the space and parallel relation between these disc members when interfitted into each other, as shown in Figs. 1 and 4, and correspond to the width of lug members L1—L2 and to the transverse dimension of the bar 19 along the axial direction of the pivots 10—11 and 12—13.

The pairs of disc members A—A1 and B—B2 are held in interlocked assembled relation by a pair of similarly formed ring members 21 and 22 having their cross shaped inner peripheral edges registering with the parallel straight edges of the disc members, while projections as 23X, 24X, 26X and 27X formed with the ring 21 serve for engaging the notches as 23—24 in the disc members A—A1, and the notches 28—29 in the disc members B—B1 for locking the two pairs of disc members to each other at the left side of the assembly as viewing at Fig. 1. Similarly, the projections 25Y—26Y and 30Y—31Y engage the notches 25 and 26 of disc members A and A1, and the notches 31W and 32W of the disc member B and B1, thus locking the two pairs of disc members A—A1 and B—B1 to the right side of connector assembly thus formed.

The ring 21 is provided with four equally spaced bearing apertures 33 cooperating with similarly located bearing apertures 34 in the ring 22 for receiving the pivots 10—11 or 12—13 of any connecting spacer bar 19 used in the erection of any desired structure, for example as shown in Fig. 5, while cooperating with the bearing apertures X—X1 in the disc members A—A1 and with bearing apertures 17—18 in disc members B—B1 to form a circular row of bearing apertures, the bearing apertures X—X1 and the bearing apertures 17—18 having their axis at right angles to the bearing apertures 33 in ring 21, and of apertures 34 in ring 22, as shown in Figs. 1 and 4.

Figure 6:
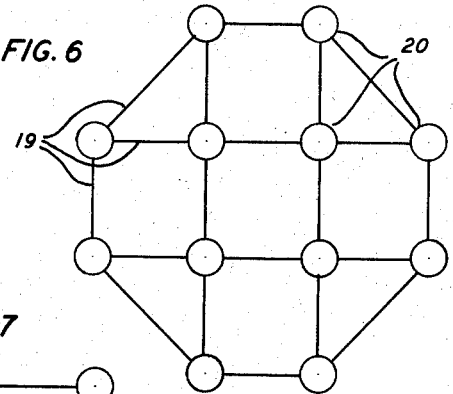
Fig. 6 is a top view of Fig. 5.
Figure 7:
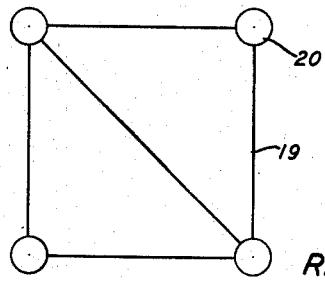
Fig. 7 is a cross-sectional view taken on line 7—7 of Fig. 5.

Connector assemblies constructed according to the present invention may be used in any number in cooperation with any number of spacer bars 19 of the desired length for the erection of structures of any size and of any geometrical figure, for example representing a square, a triangle, and angles, which may be greater or less than 45° within the limits defined by the pivotal movement of the spacer bars 19 on their pivots 10—11 or 12—13, in any one of three planes, at right angles to each other as shown in Figs. 5, 6 and 7 of the drawings.

The connector device shown in assembly view in Fig. 8, which is a modification of the connector device shown in Figs. 1 and 4, is constructed of four similarly formed disc members 36, shown in Fig. 9, each having two sector shaped projections 37 and 38 extending perpendicularly from one side thereof, and a pair of slots 39 and 40, the width of such slots corresponding to the thickness of the material used in the construction of the disc so as to interfit each other in a manner to position the rows of bearing apertures 41 of any pair of discs in axial relation, while the sector portions 37 and 38 are each provided with a bearing aperture as 42 cooperating with bearing apertures 42Y—43Y, Fig. 8, of a cooperating disc upon the interfitting of the four discs 36 to form with the bearing apertures Z—Z1, Z2—Z3, 42—43Y, etc. two rows of bearing apertures in an horizontal plane as viewing at Fig. 8, that is at right angle to the rows of bearing apertures in the vertical planes of the discs to form a connector assembly as shown in Figs. 1 and 4, the width of the tongue T3 formed by slots 39 and 40 in each disc serving for determining the space and parallel relation of the discs in their assembled relation, which space is equal to that of the width of the spacer bar 19 along the axis of the pivots 10—11 and 12—13. The engagement of such pivots in the bearing apertures being effected by flexing the prongs P or P1 of the spacer bar toward each other an amount sufficient as to allow the pivots to pass freely between any two cooperating discs and releasing the pressure onto the prongs for permitting such prongs to spring back to their normal straight line position and thereby engaging the pivots into their respective bearing apertures.

The connector device shown in Fig. 10, which is another modification of the connector device shown in Fig. 1, consists of two pairs of disc members A2—A4 and B2—B4 having each a pair of slots as 65—66 and 67—68 in the discs A2—A4, and slots 71—72 and 69—70 in the disc members B2—B4 serving for interfitting the discs into each other in the manner above described in connection with the connector device shown in Figs. 1 and 4. The notches 23X—24X and 25X—26X formed in disc members A2—A4, and the notches 23Y—24Y and 25Y—26Y in disc members B2—B4 are made of a width corresponding to the thickness of the material used in the making of the locking rings 44 and 45 shown in detail in Fig. 11.

The ring members 21X and 22X are each formed at their inner peripheries with four pairs of slots, as 46 in ring 21X, and slots 47 in ring 22X, disposed at right angles to each other so as to register with the diametrically opposite parallel edges 50—51 of the disc members A2—A4 and 50—51 of disc members B2—B4 when assembled as shown in Fig. 10, while the slots 47 of disc member 22X register with the parallel edges 48—49 of discs B2—B4 and the parallel edges 48 and 49 of disc members A2—A4. The lugs 52 and 53 in rings 21X and 22X cooperate with tongues T and T2 of disc members A2—A4 for determining the space and parallel relation between these disc members when placed in assembled relation, while the equally spaced bearing apertures 54 in disc 21X and the four equally spaced bearing apertures 55 in disc 22X cooperate with each other for receiving the coaxially disposed pivots 10—11 or 12—13, as the case may be, carried by the spacer bar 19.

The width of the slots 23X—24X and 25X—26X in the disc members A2—A4, and the width of the slots 23Y—24Y and 25Y—26Y in disc members B2—B4, are made equal to the thickness of the rings 44 and 45, these rings serving for locking the two pairs of discs and the rings 21X and 22X in their assembled relation, as will be hereinafter described in detail.

The locking ring 44 is provided with four pairs of slots 56, 57, 58 and 59, the slots in each pair being spaced to register with the parallel edges 50 and 51 of disc members A2—A4 and with the parallel edges 50, 51 of disc members B2—B4 to the left side of the connector, as viewing at Fig. 10, while ring 45, like that of ring 44, is provided with four pairs of slots 60, 61, 62 and 63, spaced to register with the parallel edges 48 and 49 of discs B2—B4 and 48—49 of disc members A2—A4 to the right of the connector, as viewing at Fig. 10, for interlocking these discs in assembled relation to each other. The rings 44 and 45 are each provided with four equally spaced bearing apertures 54Y and 55Y respectively, so disposed to their respective pairs of slots 56, 57, 58 and 59, and 60, 61, 62 and 63, as requiring a small angular movment of these rings for locating the four bearing apertures 54Y and 55Y in axial relation with the bearing apertures 54 in ring 21X and bearing apertures 55 in ring 22X, thereby locking the rings 21X and 22X in the manner of a bayonet-lock, the rings 44 and 45 are then held against rotary movement in the set position, as shown in Fig. 10, by the pivots 10—11 or 12—13 of the spacer bar 19 extending into the bearing apertures 54—54Y and 50—55Y, the rings 44 and 45 being knurled at their peripheries for facilitating the turning movement of these rings in the final assembly of the connector device.

In the connector device assembly shown in Figs. 1 and 4, the ring members 21 and 22 are interlocked in position over the parallel edges of the disc members A—A1 and B—B1 following the interengagement of the latter with each other by imparting an inwardly side way pressure to these discs so as to flex them, an amount corresponding to the distance between the corner projections 23X, 24X, 26X and 27X formed with disc member 21, and 25Y, 26Y, 30Y and 31Y formed with disc member 22, to cause these corner projections to enter into the slots upon the release of the pressure and the consequent return of the disc members to their normal planes by the medium of their own resiliency, thus locking the rings 21 and 22 in assembled relation with the disc members at their respective side.

It is to be understood that minor changes may be made to the connector device of this invention, as to size and material, without departing from the scope of the appended claims.

What I claim is:

1. A device for use for connecting spacer bars having coaxially disposed pivots at both ends thereof, said device comprising a plurality of disc shaped members arranged in parallel spaced pairs, said disc shaped members in one pair having means for interfitting in the other pairs of said disc members, each of said members in said pairs having a circular row of bearing apertures cooperating with each other in respective pair for receiving the pivots at one of the ends of the spacer bars for connecting the spacer bars to said device.

2. The elements of a quick erectable structure comprising a plurality of bars having a pair of coaxially disposed pivots at each of their ends in combination with a connector device, said device comprising a plurality of relatively thin flat disc members having means for interengaging each other in parallel spaced relation in pairs, and means carried by said disc members in each pair cooperating with each other for receiving the pivots carried by said bars for connecting such bars at one end to said device.

3. A connector device for use for connecting spacer bars in the erection of a structure, said device comprising a plurality of disc members having means disposed for interfitting each other in parallel disposed spaced pairs in axial relation, said disc members in each pair having means cooperating with each other for receiving means carried by the spacer bars for connecting the bars to said device, and a pair of ring shaped members having means for interlocking with means carried by said disc members for holding such disc members in interfitted relation.

4. A connector device for use for interconnecting spacer bars serving for the erection of a structure, said device comprising a plurality of disc shaped members, each of said members having a circular row of equally spaced bearing apertures adjacent the peripheral edge thereof, and means formed in said disc members for interfitting each other in assembled spaced relation in parallelly disposed pairs in planes at right angles to each other, said bearing apertures in each pair of said disc members cooperating for receiving pivots carried by the spacer bars for connecting such bars to said device.

5. A connector device for connecting spacer bars in the erection of structures, said device comprising a plurality of disc shaped members arranged by pairs, each of said members having bearing apertures disposed in circular row, the bearing apertures in one of said disc members cooperating with the bearing apertures in the other disc member in their respective pairs for receiving coaxially disposed pivots carried by the spacer bars, means formed with said disc shaped members for locating said disc members in assembled spaced relation in said pairs at right angles to each other, and a pair of ring members having means interfitting with means carried by said disc members in each of said pairs for interlocking said disc members in said relation.

6. A device for use for interconnecting spacer bars in the erection of a structure, said device comprising a plurality of similarly formed disc members, each of said disc members having a pair of parallelly disposed means extending from the periphery of said disc to a line passing substantially through the center thereof for interengaging said disc members in spaced and parallel relation to each other, a tongue-like member formed in each of said discs defining the space relation between said disc members when in assembled relation in pairs at right angles to each other, and means carried by each of said disc members forming bearing apertures cooperating with each other in each of said pairs for receiving pivots at one of the ends of the spacer bars.

7. A device for use for connecting spacer bars used in the erection of structures, said device comprising a plurality of angularly engaged disc shaped members arranged in a plurality of pairs and each disc in each pair in parallel spaced relation to each other, means carried by said disc members for defining the space relation between said discs in each of said pairs, a circularly disposed row of bearing apertures formed in each of said disc shaped members cooperating with each other in each of said pairs for receiving coaxially disposed pivots carried by the spacer bars, and a pair of flat rings having means at their inner peripheries for interlocking with means at the outer peripheral edges of said disc members for holding said disc members in assembled relation, said rings having bearing apertures cooperating with a number of bearing apertures in respective pair of said discs for receiving the pivots of the spacer bars in a row at right angles to the planes of said interengaged discs.

8. A connector device for use for connecting spacer bars used for the erection of a structure, the spacer bars being formed with a pair of prongs having coaxially disposed pivots at their ends, said device comprising a plurality of disc shaped members having means for interengaging each other in parallel spaced pairs disposed in different plane relations, said disc members having a plurality of bearing apertures cooperating with each other in each pair for receiving the coaxially disposed pivots at the ends of the prongs formed with the spacer bars, and a plurality of rings having means for interlocking said disc members in said interengaged relation.

9. A connector device for use for connecting spacer bars having coaxially disposed pivots at their ends, said device comprising a plurality of relatively thin flat disc members having means for interengaging each other in spaced parallelly disposed pairs and each pair in angular relation to each other, each of said disc members having a circular row of equally spaced bearing apertures, the bearing apertures in one of said disc members in one of said pairs cooperating with the bearing apertures in the cooperating disc member in the last mentioned pair for receiving the pivot elements carried by said bars for connecting the latter at one end to said device.

10. A connector device for use for connecting spacer bars in the erection of a structure, said device comprising a plurality of disc members having means for parallel interengaging each other in pairs at right angles to each other, means carried by said disc members for determining the spaced relation therebetween in each of said pairs, a circularly disposed row of bearing apertures formed in each of said disc members cooperating with each other in said pairs for receiving means carried by the bars for connecting the bars with said device, and a plurality of flat ring members having means for engaging means carried by said disc members for securing said disc members in said spaced relation, said ring members having a plurality of bearing apertures cooperating with a number of bearing apertures in said disc members to form a row of bearing apertures at right angles to the first mentioned rows for connecting the bars to said device in each of said rows.

References Cited in the file of this patent

UNITED STATES PATENTS

| 1,124,526 | Richter | Jan. 12, 1915 |
| 2,410,875 | Segal | Nov. 12, 1946 |
| 2,709,318 | Benjamin | May 31, 1955 |
| 2,780,484 | Frye | Feb. 5, 1957 |